United States Patent [19]

Fukaya et al.

[11] Patent Number: 4,754,118

[45] Date of Patent: Jun. 28, 1988

[54] METHOD FOR FABRICATING A STRUCTURAL ASSEMBLY HAVING NARROW GAPS

[75] Inventors: Yasuhiro Fukaya; Nagio Minami; Hiroshi Ishitani; Hiroshi Kondo; Tamotu Oka; Toshihiko Ohshita; Susumu Izaki, all of Hiroshima, Japan

[73] Assignee: Mitsubishi Jukogyo Kabushiki Kaisha, Tokyo, Japan

[21] Appl. No.: 831,589

[22] Filed: Feb. 21, 1986

[30] Foreign Application Priority Data

| May 16, 1985 | [JP] | Japan | 60-104465 |
| Jul. 26, 1985 | [JP] | Japan | 60-165381 |
| Nov. 5, 1985 | [JP] | Japan | 60-246411 |
| Nov. 18, 1985 | [JP] | Japan | 60-257955 |

[51] Int. Cl.$^4$ .......................... B23K 9/02; B23K 9/225
[52] U.S. Cl. .................................. 219/137 R; 219/136
[58] Field of Search ............... 219/137 R, 149, 162, 219/136; 228/214, 215, 203

[56] References Cited

U.S. PATENT DOCUMENTS

| 3,221,135 | 11/1965 | Maier, Jr. .................. 219/137 R |
| 3,533,153 | 10/1970 | Melill et al. .................. 228/214 |
| 3,736,400 | 5/1973 | Spiegel et al. .............. 219/137 R X |

Primary Examiner—E. A. Goldberg
Assistant Examiner—C. M. Sigda
Attorney, Agent, or Firm—Holman & Stern

[57] ABSTRACT

A method for assembling narrow gap members by welding is described. In the method, separate narrow gap members having spaces therein when assembled are provided and a deformation-preventive material consisting of a water-soluble material or a material capable of being disintegrated with water is filled in each space and is formed with a through groove or hole in the filled preventive material. In this state, the separate narrow gap members are subjected to welding, and immersed in water to remove the deformation-preventive material from each space. The through grooves may have a width larger than a leg length of each penetration bead, in which a heat-resistant flux is filled in each groove. The deformation-preventive material may be covered with a heat-resistant ceramic backing member shaped in a specific form or with a heat-resistant particle layer and a copper member shaped in conformity with an intended size and shape of a penetration bead.

3 Claims, 4 Drawing Sheets

METHOD FOR FABRICATING A STRUCTURAL ASSEMBLY HAVING NARROW GAPS

FIELD OF THE INVENTION AND RELATES ART STATEMENT

This invention relates to a method for fabricating structures having narrow gaps and more particularly, to a method for assembling such structure by welding in high accuracy.

For the fabrication of a structural assembly such as, for example, an impeller of a compressor, which requires spaces in the form of narrow gaps, there is known a method in which narrow gaps are formed by electric discharge machining. However, this method unfavorably requires much time and involves a high production cost because of the consumption of electrodes. Accordingly, the fabrication by assembling using welding has still be made in this art.

A conventional method of fabricating a structural assembly having narrow gaps by welding comprises, as shown in FIG. 1, placing on a lower plate 1 having ribs 2 upper plates 3 with bevellings (groove) 4 and bonding the bevelled portions by welding.

The conventional method of assembling narrow gap members by welding has the problem that an initial gap height, Ho, prior to welding, which is shown in FIG. 2, is varied to $H_1$ after the welding as shown in FIG. 3. This is caused by shrinkage of a weld 5. The degree of the weld shrinkage varies depending on a slight variation of welding conditions and thus, it has been very difficult to form narrow gaps of a high size accuracy.

To avoid this problem, there has been proposed a method of preventing the weld shrinkage in which welding is effected while inserting deformation-preventive members 8 such as iron pieces or solid ceramics into gaps. However, this method involves another disadvantage that the deformation-preventive members 8 are firmly held by the shrinkage and are very difficult to remove after completion of the assembling.

OBJECTS AND SUMMARY OF THE INVENTION

A primary object of the invention is to provide a method for assembling narrow gap members by welding while keeping a high size accuracy of the narrow gap spaces.

The method of assembling narrow gap members by welding according to the invention is characterized by comprising filling a deformation-preventive material consisting of a water-soluble material or a material capable of disintegration by water into spaces which are gaps of a finally assembled structure, forming a through groove or a through hole in part of the deformation-preventive material, assembling the narrow gap members by welding, and immersing the assembled structure in water to remove the deformation-preventive material by dissolution.

Another object of the invention is to provide a method of welding narrow gap members by which penetration beads having a given leg length can be formed without involving weld defects.

This is achieved, according to the invention, by a method of welding narrow gap members consisting of a ribbed plate and a plurality of plates to be associated with the ribbed plate to form gap spaces therebetween which comprises providing a water-soluble deformation-preventive material having through grooves at opposite sides of each gap space in association with the ribs, each groove having a width larger than a leg length of a penetration bead formed by welding, filling a heat-resistant flux in each groove one side of which is defined by the rib, and subjecting the members to welding.

A further object of the invention is to provide a method of welding narrow gap members in which an accurate height of each narrow gap is ensured and penetration beads having an accurate size can be obtained.

This is attained, according to the invention, by a method which comprises providing a water-soluble deformation-preventive material for preventing weld deformation in each gap space, applying, onto the preventive material, a heat-resistant ceramic backing member shaped in conformity with an intended size and shape of a penetration bead formed by welding, and subjecting the narrow gap members to welding, thereby keeping an accurate narrow gap height and forming a precise penetration bead.

Alternatively, the above object may also be achieved by a method which comprises providing a water-soluble deformation-preventive material for preventing weld deformation at narrow gap portions, forming, on the water-soluble deformation-preventive material, a heat-resistant particle layer and a copper member shaped in conformity with an intended size and shape of penetration beads formed by welding, and welding the narrow gap members, whereby the penetration bead can be formed in a high accuracy.

The objects, features and advantages of the present invention will become clear from the following detailed description with reference to the accompanying drawings.

DETAILED DESCRIPTION OF PREFERRED EMBODIMENT

The deformation-preventive materials used in the practice of the invention are preferably materials, such as gypsum, which are capable of filling in gaps in a fluid state and being set by drying or by the action of a hardening agent.

The formation of a through groove or hole in the deformation-preventive material facilitates penetration of water when the deformation-preventive material is removed by immersion in water after welding. Accordingly, the through groove or hole has to be opened at opposite sides thereof.

One embodiment of the present invention is described as applied to the assembling of narrow gap members of the same structure as shown in FIGS. 1 to 4.

Figure 1:
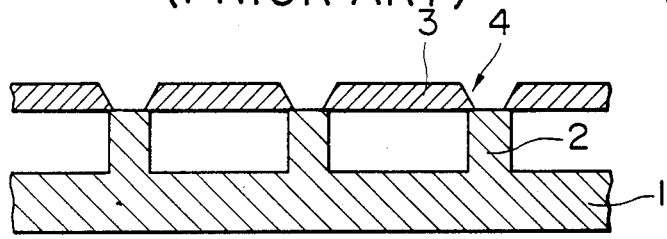
FIG. 1 is a sectional view illustrating a known method of assembling narrow gap members by welding.
Figure 2:
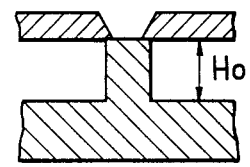
FIGS. 2 and 3 are sectional views illustrating the drawback of the known method.
Figure 3:
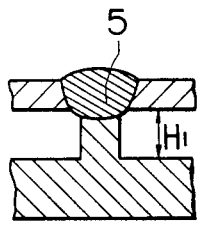
Figure 4:
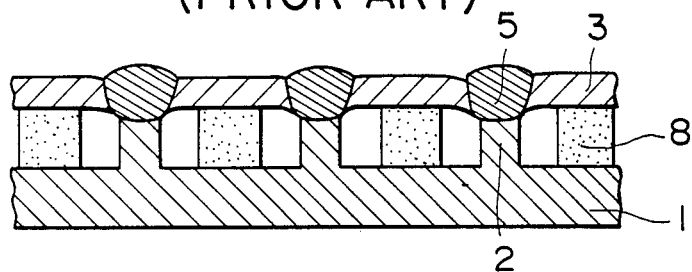
FIG. 4 is a sectional view illustrating another known method of assembling narrow gap members by welding and the problem involved therein.
Figure 5:
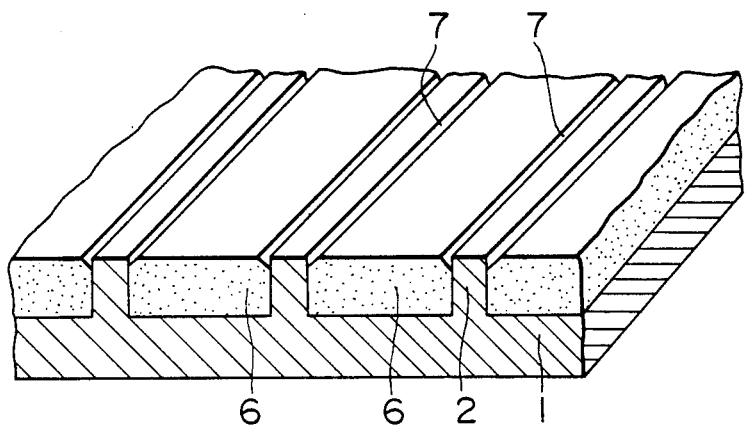
FIGS. 5 and 6 are illustrative views of a method of assembling narrow gap members by welding according to one embodiment of the invention.

As is particularly shown in FIG. 5, a water-soluble deformation-preventive material 6 is filled in spaces partitioned with ribs 2 vertically extending from a lower plate 1, after which through grooves 7 are formed along the length of the material 6 at opposite sides as shown. If gypsum is used as the deformation-preventive material 6, it is possible to form the through grooves 7 simultaneously with the filling by a casting technique in which fluid gypsum is poured into the spaces and set.

Figure 6:
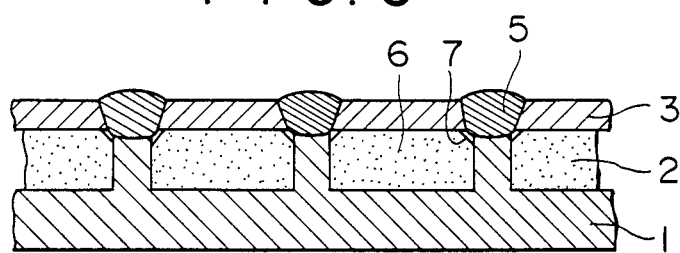

In this state, upper plates 3 are welded at the grooves thereof as shown in FIG. 6, integrally assembling the narrow gap members by the welds 5. Since the deformation-preventive material 6 exists in each space, the weld shrinkage in the vertical direction can be completely prevented. After the welding, the through grooves 7 formed at opposite sides of the deformation-preventive material are left as spaces by the formation of penetration beads.

Subsequently, the thus welded narrow gap member assembly is immersed in water, thereby permitting water to be penetrated into the deformation-preventive material 6. As a result, the deformation-preventive material 6 is dissolved or softened by disintegration and can thus be readily removed. If the through grooves 7 are not formed, it would take a long time before water penetrates into inside. Since the grooves 7 extend along the length of the filled material 6, water can readily and easily reach the inside of the deformation-preventive material 6. It will be noted that instead of forming the through grooves 7 on the surface of the deformation-preventive material 6, a through hole may be provided at the center of the material 6 to attain similar effects.

Examples of the above embodiment of the invention and comparative examples are described for illustration.

EXAMPLE 1 AND 2

The lower plate 1 with the ribs 2 and the upper plates 3 (rib thickness 5mm, rib height 8 mm and rib pitches 50 mm) of the forms indicated in FIGS. 5 and 6, were provided and assembled by welding to obtain a narrow gap member assembly having narrow gaps with a length of 150 mm. These plates were made of chromium/molybdenum steel and assembled by a TIG welding technique (preheating temperature of 200° C.). The deformation-preventive material 6 was commercially sold disintegrable gypsum kneaded by addition of 50% of water (Example 1) or alumina powder kneaded with 5% of potassium carbonate (Example 2). These materials were each poured into the narrow gap spaces and allowed to stand for 2 hours for solidification, after which the upper plates were removed and the through grooves 7 having a depth of 3 mm were formed as shown in FIG. 5.

COMPARATIVE EXAMPLE 1

The general procedure of the above examples was repeated except that the deformation-preventive material 6 was not used, thereby obtaining a narrow gap member assembly by welding.

COMPARATIVE EXAMPLES 2 AND 3

The general procedure of the above examples was repeated except that the through grooves 7 were not formed in the surface of the deformation-preventive material 6, thereby obtaining two narrow gap member assemblies.

The results of Examples 1, 2 and Comparative Examples 1 to 3 are shown in Table 1 below.

TABLE 1

| Deformation-preventive material | Groove | Height H0 of initial narrow gap space | Height H1 gap space after welding (average of 10 measurements) | Scattering of of H1 | Disintegrating time of deformation preventive material by immersion in water |
|---|---|---|---|---|---|
| Comparative Example 1: no | — | 8.0 mm | 6.9 mm | ±0.5 mm | — |
| Example 1: disintegrable gypsum + water | yes | 8.0 mm | 7.3 mm | ±0.2 mm | 3 hours |
| Comparative Example 2: disintegrable gypsum + water | no | 8.0 mm | 7.3 mm | ±0.2 mm | 24 hours |
| Example 2: alumina + potassium carbonate | yes | 8.0 mm | 7.5 mm | ±0.1 mm | 2 hours |
| Comparative Example 3: alumina + potassium carbonate | no | 8.0 mm | 7.5 mm | ±0.1 mm | 20 hours |

As will be apparent from the comparison with the results of Comparative Example 1, the procedure of Examples 1, 2 is effective in keeping the high size accuracy of the narrow gaps. The comparison with the results of Comparative Examples 2,3 reveals that the time required for disintegration of the deformation-preventive material 6 is shorter for Examples 1, 2.

Thus, the method according to the above embodiment of the invention is very effective in assembling narrow gap members by welding while maintaining the narrow gap spaces in high accuracy.

Another embodiment of the invention is then described. When the grooves 7 of the deformation-preventive material 6 are the same length as the leg length of a penetration bead of the welding bead 5, there is the fear that the penetration bead is brought into direct contact with the deformation-preventive material 6, so that the deformation-preventive material 6 may be partly molten or gases may generate from the deformation-preventive material 6, thus producing weld defects in the penetration bead such as cracks or blowholes.

On the other hand, where the width of the grooves 7 of the deformation-preventive material 6 is sufficiently larger than the leg length of the penetration bead, the penetration bead does not directly contact the deformation-preventive material 6. Accordingly, the above weld defects are not produced, but it becomes difficult to form penetration beads having a given leg length because of the variation of welding conditions.

In order to cope with the above difficulty, the welding of narrow gap members consisting of a lower ribbed plate and upper plates is effected by a method in which a water-soluble deformation-preventive material is filled in each narrow gap defined by ribs while forming grooves in the surface of the preventive material at opposite sides near the ribs. The groove is so formed to be larger than a leg length of penetration bead produced by the welding and a heat-resistant flux is filled between each groove and each rib.

The wider grooves of the deformation-preventive material are advantageous because the penetration bead does not directly contact the deformation-preventive material filled in each gap.

Since the flux filled in each groove defined at one side with each rib is resistant to heat, it does rarely melt on contact with the penetration bead, giving any adverse influence on the penetration bead.

Moreover, the heat-resistant flux existing in the groove serves to control the penetration bead with a given leg length.

This second embodiment of the invention is described with reference to FIGS. 7 and 8.

First, there is provided a lower plate 22 which has ribs 21 to form a recess (corresponding to a narrow gap) between adjacent ribs 21 and consists of a Cr-Mo steel. A deformation-preventive material 25 consisting of disintegrable gypsum is filled in each recess while forming grooves 24 in association with the ribs 21 at opposite sides of each filled material. The grooves 24 should have a width sufficiently larger than a leg length of each penetration bead formed by welding. Subsequently, a heat-resistant flux 27 is filled in the grooves 24 defined by the ribs 24 at one side of the grooves 24 to such a level lower, for example, by 2 mm than the upper surface of each rib 21. The flux 27 may have, for example, a composition having a melting point of 1500° C. and composed of 50% of MgO, 15% of $CaF_2$, 10% of $Al_2O_3$, 20% of CaO and 5% of $SiO_2$. Next, upper plates 23 consisting of a Cr-Mo steel are mounted on the lower plate 22 in such a way that grooves 28 are established in association with the ribs 21, followed by TIG welding to form welding beads 26. After welding, water is applied to the narrow gap portions by which the flux 27 can be removed along with the deformation-preventive material 25.

On examination of the leg length of the penetration bead 26' after the welding, the results of Table 2 are obtained. In the Table, there is shown the case of the invention where the flux used has a melting point of 1500° C. as indicated before, in comparison with the cases where an ordinary welding flux having a melting point of 1050° C. is used and no flux is used.

TABLE 2

| Flux | | Leg Length of Penetration Bead (along the extending direction of rib) |
|---|---|---|
| Embodiment of Invention: | | |
| | flux having a melting point of 1500° C. | 2.0–2.1 mm |
| Comparative Example: | | |
| 4 | flux having a melting point of 1050° C. | 2.1–2.9 mm |
| 5 | no flux | 2.3–4.8 mm |

It has been experimentally confirmed that the penetration bead after welding according to this second embodiment of the invention involves little or no welding defects such as cracks and blowholes.

This second embodiment of the invention is advantageous in that since water-soluble deformation-preventive materials are filled in narrow gaps, weld deformation can be completely prevented and thus a narrow gap member assembly can be fabricated in high accuracy; and a heat-resistant flux is filled in grooves established by the preventive material and the ribs, so that smooth penetration beads can be formed without adversely influencing the welding and involving any welding defects.

Figure 7:
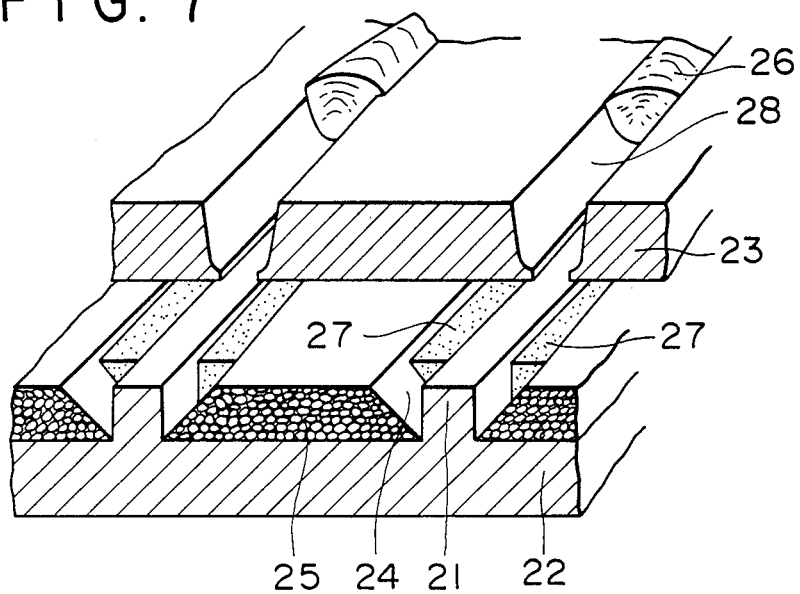
FIG. 7 is a perspective view, partially cut away, illustrating a welding method according to another embodiment of the invention.
Figure 8:
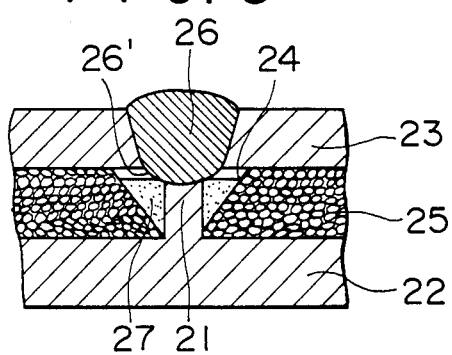
FIG. 8 is a sectional view of the weld of FIG. 7.
Figure 9:
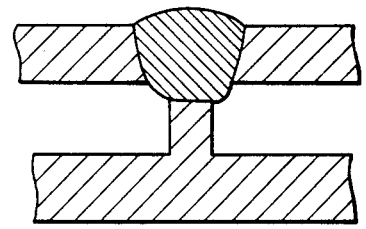
FIG. 9 is a sectional view of an unfavorable weld.
Figure 10:
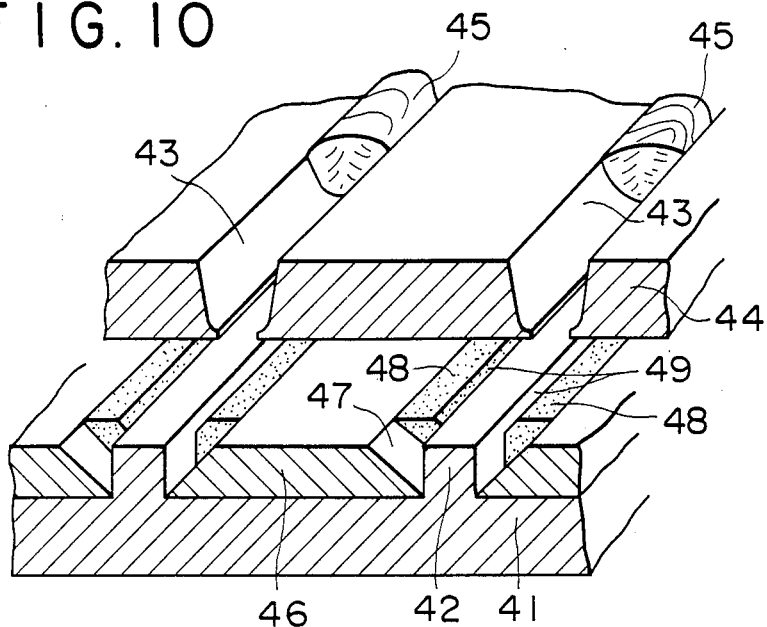
FIG. 10 is a perspective view, partially cut away, illustrating a welding method according to a further embodiment of the invention.

In the second embodiment of FIGS. 7 and 8, (1) if the welding is effected using a large electric current, there may be formed penetration beads which have irregular leg lengths or which are larger than the space established between a filled flux and the upper plate as particularly shown in FIG. 9; and (2) when a filled flux layer remains in the form of a powder, the down welding is possible, but the vertical position welding is not possible because of the movement of the flux layer.

In view of the above, in order to obtain penetration beads which have good appearance and a high size accuracy, it is favorable to provide a backing member which does not melt and remains as solidified on contact with the penetration bead.

According to a third embodiment of the invention, there is provided a method which comprises filling a water-soluble deformation-preventive material in narrow gaps of a lower plate defined by ribs vertically extending from the upper plate, placing, on each preventive material, a heat-resistant ceramic backing member shaped in conformity with a size and shape of each penetration bead formed during welding, and subjecting the lower plate and upper plates to welding, thereby keeping a given height of each narrow gap and forming intended penetration beads.

According to this embodiment of the invention, water-soluble deformation-preventive materials are used with the advantages described hereinbefore. Moreover, a heat-resistant ceramic backing member which is shaped in conformity with a size and shape of a penetration bead, is provided on each preventive material filled in the gap. As a result, a precise penetration bead can be formed by welding.

This embodiment of the invention is more particularly described with reference to FIGS. 10 to 13.

In the figures, there is shown a lower plate 41 which consist, for example, of a Cr-Mo steel and which has upwardly extending ribs 42. On the lower plate 41 are mounted upper plates 44 having grooves 43. Reference numeral 45 denotes welded metal layers formed on the grooves 43.

Figure 11:
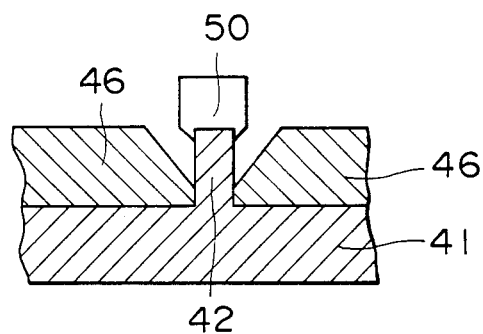
FIGS. 11 and 12 are sectional views showing the steps of the embodiment of FIG. 10.
Figure 12:
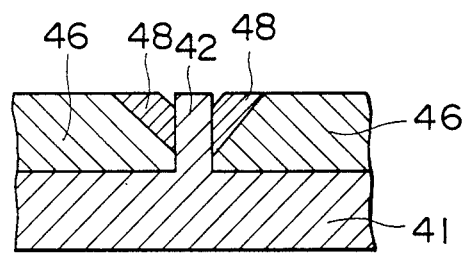
Figure 13:
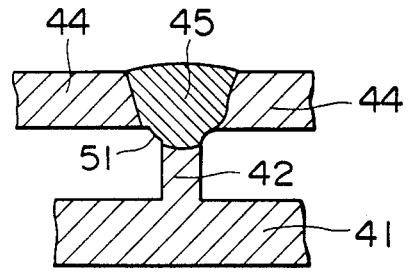
FIG. 13 is a sectional view of a weld obtained by the further embodiment.

For the welding between the lower plate 41 and the upper plates 44 according to this embodiment, a water-soluble deformation material 46 consisting, for example, of disintegrable gypsum is used to form bevelled grooves 47 in the narrow gaps. Subsequently, a heat-resistant ceramic layer 48, which may consist of a mixture of an alumina powder having a size not larger than 5 micrometers ($Al_2O_3$, melting point about 2000° C.) and 30% by volume of water glass and has a melting point higher than steels, is formed in each bevelled groove 47 as a backing member. The heat-resistant ceramic layer 48 should withstand the temperature of a penetration bead (about 1500° C.) at the time of welding. The ceramic layer 48 is formed as follows: a tool 50 adapted for a required shape of the penetration bead 49 is mounted on each rib 42 as shown in FIG. 11 and the ceramic is tamped. Thereafter, the tool 50 is removed as shown in FIG. 12 and then carbon dioxide is injected over the ceramic for setting. In this state, the upper plates 44 are mounted and subjected to TIG welding. As a consequence, there are obtained penetration beads 51 having an intended leg length of, for example, 2 mm with a high size accuracy and having such a sectional shape as shown in FIG. 13.

In this embodiment, the heat-resistant ceramic layer 48 shaped in conformity with a required size and shape of a penetration bead is mounted on each deformation-preventive material 46. Accordingly, the penetration bead 51 can be formed precisely by welding. In addition, water glass is used as a binder and thus, the ceramic layer is set by means of carbon dioxide. The backing member of a complicated shape can be readily formed at room temperature.

As a matter of course, the backing member may be formed by other methods. A shaped ceramic which is obtained by charging and sintering a ceramic powder in an ordinary mold, may be provided as the backing member. Ceramics other than alumina may also be used.

Additionally, water glass is set by the action of $CO_2$ gas in the above embodiment. Alternatively, water glass may be set by addition of a self-curing agent such as cements, a certain type of slag (mainly composed of $2CaO.SiO_2$), Al, Si, FeSi or the like.

A still further or fourth embodiment of the invention which can attain the same purpose as the method illustrated with reference to FIGS. 10 to 13, is described.

In this embodiment, a heat-resistant particle layer is formed on the water-soluble deformation-preventive material formed in each gap, on which a copper member shaped in conformity with a size and shape of a penetration bead is formed on the particle layer, followed by welding as described before. This ensures formation of penetration beads whose size accuracy is high.

The formation of penetration beads of a high size accuracy results from the copper member shaped in conformity with the size and shape of the penetration bead. In addition, since the heat-resistant particle layer exists between the shaped copper member and the water-soluble deformation-preventive material, the copper member can be accurately set in position. If the copper member heated by thermal absorption directly contacts the water-soluble deformation-preventive material, the preventive material may undergo a thermal change, thereby generating harmful gases for welding.

However, the presence of the heat-resistant particle layer between the copper member and the preventive material can prevent the generation of such gases.

Figure 14:
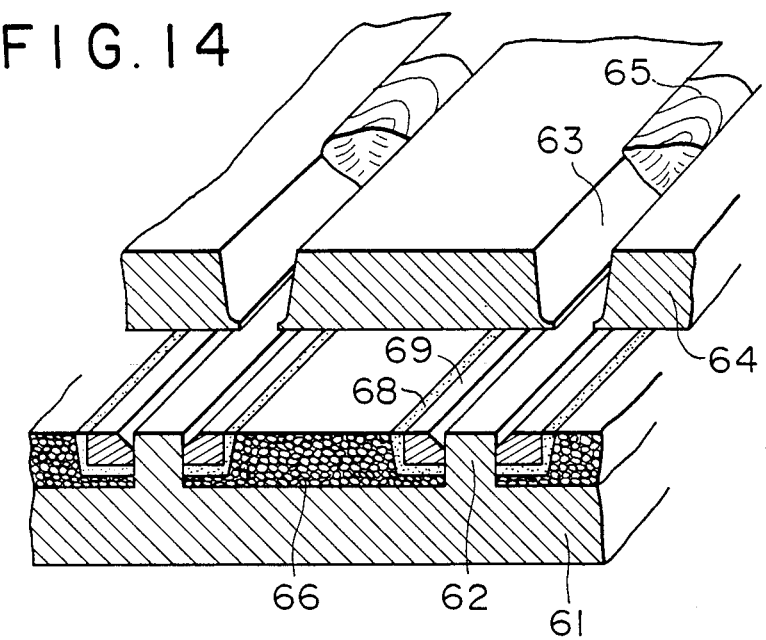
FIG. 14 is an illustrative view, partially cut away, of a welding method according to a still further embodiment of the invention.
Figure 15:
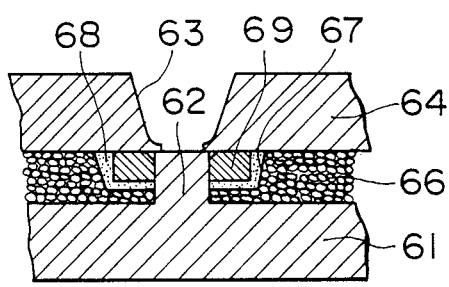
FIG. 15 is a sectional view of an essential part of FIG. 14 prior to welding.
Figure 16:
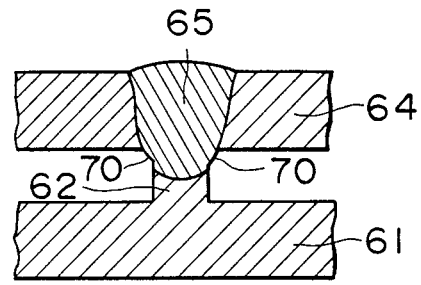
FIG. 16 is a sectional view of the weld of FIG. 14.
Figure 17:
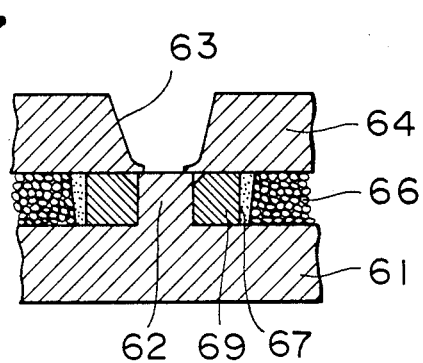
FIG. 17 is a sectional view illustrating the case where a copper member having the same height as a height of ribs is used in accordance with the method illustrated in FIG. 14.

The fourth embodiment of the invention is more particularly described with reference to FIGS. 14 through 16.

In the figures, there is shown a lower plate 61 consisting, for example, Cr-Mo steel similar to the foregoing embodiments. The lower plate 61 has upwardly extending ribs 62 having a height of 10 mm. On the lower plate 61 are mounted upper plates, for example, of Cr-Mo steel having grooves 63, in which weld metal layers 65 are formed.

In this embodiment, a water-soluble deformation-preventive material 66 such as commercially available disintegrable gypsum is filled in each gap established between adjacent ribs 62 while forming 10 mm wide and 8 mm deep grooves 67 at opposite sides of the filled material 66 in association with the respective ribs 62. Next, commercially available heat-resistant particles 68 for penetration welding are filled in each groove in a thickness of about 3 mm, on which a 8 mm wide and 6 mm thick copper member 69 bevelled at one corner thereof is placed as a backing member so that the upper surface of the member 69 is forced to be coincident with the height of the rib 62. Thereafter, heat-resistant particles are charged into a gap between one side of the copper member 69 and the deformation-preventive material 66, causing the copper member 69 to be brought into intimate contact with the rib 62. In this state, the upper plates 64 are mounted in position and subjected to TIG welding. As a result, there is obtained a precise penetration bead 70 having such a sectional shape as shown in FIG. 16 and a leg length, for example, of 2 mm.

In this embodiment, since the copper member 69 shaped in conformity with a size and shape of an intended penetration bead is provided as the backing member, a precise penetration bead can be obtained. This is for the following reason. The temperature of molten metal is approximately 1500° C., which only a local portion beneath weld reaches. On the other hand, the copper member 69 has a melting point of about 1100° C. Because of the good thermal conductivity, even though the molten metal contacts the copper member on welding, the heat on the contact surface is sufficiently absorbed, permitting the molten metal to be solidified to form penetration bead. Thus, the copper member 69 shaped in conformity with a required size and shape of a penetration bead ensures a penetration bead of a high size accuracy.

Moreover, since the heat-resistant particle layer 68 are provided between the copper member 69 and the deformation-preventive material 66, the copper member 69 can be precisely set in position. For the same reason, where the copper member 9 absorbing heat directly contacts the deformation-preventive material 66, the deformation-preventive material 66 undergoes a thermal change and may generate harmful gases for welding. This can be prevented by the presence of the heat-resistant particle layer 68.

In the above embodiment, the copper member is used as the backing member, but a water-cooled copper member for facilitating cooling may be used.

For comparison, when the copper member (backing member) 69 which has the same height as the rib 62 is used, the copper member 69 is firmly held between the lower plate 61 and the upper plate 64 due to a slight degree of deformation by weld shrinkage which cannot be prevented by the deformation-preventive material 66.

As will be apparent from the foregoing, the present invention provides a method of welding narrow gap members in which penetration beads can be formed in a high size accuracy.

We claim:

1. A method for welding narrow gap members consisting of a ribbed plate having a plurality of ribs and a plurality of plates to be associated with said ribbed plate to form gap spaces therebetween wherein a penetration bead is to be formed, the method comprising providing a deformation-preventive material having through grooves at opposite sides of each gap space in association with the ribs, each groove having width larger than a leg length of said penetration bead formed by welding, filling a heat-resistant flux in each groove one side of which is defined by the rib, and subjecting the narrow gap members to welding.

2. A method for welding narrow gap members having gap spaces therein when assembled wherein a penetration bead is to be formed, the method comprising providing a water-soluble deformation-preventive material in each gap space, applying onto the water-soluble deformation-preventive material, heat-resistant ceramic backing member shaped in conformity with an intended size and shape of said penetration bead formed by welding, and subjecting the narrow gap members to welding.

3. A method for welding narrow gap members having gap spaces therein when assembled wherein a penetration bead is to be formed, the method comprising providing a water-soluble deformation-preventive material in each space applying onto the water-soluble deformation-preventive material, heat-resistant particle layer and then a copper member shaped in conformity with an intended size and shape of said penetration bead formed by welding, and subjecting the narrow gap members to welding.

* * * * *